United States Patent [19]
Bailey, Jr.

[11] Patent Number: 5,094,775
[45] Date of Patent: Mar. 10, 1992

[54] ZEOLITE MODIFIED WATER-BLOWN POLYURETHANE FOAMS

[75] Inventor: Frederick E. Bailey, Jr., Charleston, W. Va.

[73] Assignee: Arco Chemical Technology, Inc., Wilmington, Del.

[21] Appl. No.: 327,125

[22] Filed: Mar. 22, 1989

[51] Int. Cl.$^5$ .................... C08G 18/28; C08K 7/26
[52] U.S. Cl. .................... 252/182.24; 252/182.13; 252/182.27
[58] Field of Search .................. 252/182.24, 182.27

[56] References Cited

U.S. PATENT DOCUMENTS

| | | | |
|---|---|---|---|
| 3,326,844 | 6/1967 | Gruber | 524/450 |
| 4,288,559 | 9/1981 | Illger et al. | 521/55 |
| 4,447,565 | 5/1984 | Lula et al. | 523/219 |
| 4,518,718 | 5/1985 | Frost | 521/122 |
| 4,526,906 | 7/1985 | Wegner | 521/107 |
| 4,857,584 | 8/1989 | Vandermeersch et al. | 524/791 |
| 4,882,363 | 11/1989 | Neuhaus et al. | 521/54 |

FOREIGN PATENT DOCUMENTS

| | | |
|---|---|---|
| 52-63997 | 9/1977 | Japan . |
| 6041233 | 9/1979 | Japan . |
| 54-39857 | 11/1979 | Japan . |
| 57-49628 | 8/1982 | Japan . |
| 1285224 | 8/1972 | United Kingdom . |

OTHER PUBLICATIONS

Ken-React Reference Manual, K. Petrochemicals, Inc., NJ, 1987.

Primary Examiner—John Kight, III
Assistant Examiner—Rabon Sergent

[57] ABSTRACT

Water-blown, polyurethane foams modified by incorporation of specific zeolites at levels of from about 0.5 to ten parts per hundred parts polyol exhibit superior combustibility with no halogen or phosphorus flame retardant additive in the foam. Conventional halogen/phosphorus flame retardants, while providing a level of combustion resistance, generally lead to increased smoke containing noxious, and potentially toxic, combustion products.

10 Claims, No Drawings

ZEOLITE MODIFIED WATER-BLOWN POLYURETHANE FOAMS

BACKGROUND OF THE INVENTION

1. Field of the Invention

The present invention relates to water-blown polyurethane foams which have been modified by incorporation of specific zeolties in order to improve the combustion resistance of the polyurethane foam.

2. Prior Art

The principal commercial procedure for the production of urethane foams is the technique of simultaneous reaction of polyol, polyisocyanate, water, catalyst, surfactant and various foaming aids. In addition to the expected urethane forming reaction between polyol and isocyanate, water reacts with another isocyanate to release carbon dioxide and form amine. The amine reacts with another diisocyanate to form urea groups. This complex set of reactions yields a urea-urethane polymer which is highly diluted during the foaming reaction by evolved carbon dioxide and possibly by the addition of halocarbons or other volatilizable compounds termed blowing agents. The foam which results is termed a water-blown foam.

These urethane foams have many uses such as packaging and insulation. Significant commercial volumes are employed for applications such as mattresses, furniture, automobile seating and carpet underlayment. In these latter applications, the load bearing capability of the foam is very important. To yield increased load bearing, fillers are employed in the systems. Highly effective among these fillers are organic fillers such as those prepared by polymerizing acrylonitrile or copolymerizing acrylonitrile and styrene in a polyol, termed polymer polyol. When a polymer polyol is converted into water-blown, urethane foam, a highly complex chemical and physical structure results. This foam, used in mattresses, furniture, automobile seating and carpet underlayment, is an open-celled foam of ambient air, the solid phase of which is a crosslinked network of polyurea-urethane blocked polymer, the linkages of which are separated by long, flexible elastomeric chains derived from base polyol used in the formulation and from which the polymer polyol was made. The elastic network is reinforced by the dispersed polymer filler. The characteristics of these water-blown urethane foams have led to their wide commercial acceptance. Among these special characteristics are their uniformity, load-bearing capability and resiliency. The key to successful manufacture of such complex polymeric structures is control of the reactivity and sequence of reactions which take place particularly when manufacturing engineered, shaped products such as molded foams or very large pieces of foam with controlled physical or engineering properties such as slab foams. For a detailed description of these processes, a number of texts or handbooks can be consulted such as *Polyurethane Handbook*, Edited by G. Oertel, Hanser Publishers, Munich and New York (1985).

An alternative approach to organic fillers is the incorporation of inorganic fillers into polyurethane foams for increasing foam modulus and density. Among the many types of inorganic fillers discussed in the art is zeolites. Zeolites have reportedly been incorporated in rigid foams for several purposes, including formulations which have combustion resistance. Exemplary of the uses of zeolites in foams are: as carriers for flame retardant additives, as carriers for foam reaction catalysts, and as carriers for halocarbon blowing agents. Zeolites have been incorporated into rigid foam formulations to absorb traces of water, inadvertently present in rigid formulations, which would lead to lowered thermal insulation capability of the foams produced. Finally, zeolites have also been incorporated into packaging foams for their desiccant properties. The following references are illustrative of this art:

U.S. Pat. No. 4,526,906, concerns microcellular polyurethane and teaches use of fire retardants in combination with zeolites. The patent specifically notes that the zeolites are not useful without the addition of flame retardants.

U.S. Pat. No. 4,518,718, concerns rigid foams with desiccant properties which can be used in packaging and storage containment of instruments or electronic parts and the like.

U.S. Pat. No. 4,447,565, incorporates zeolites in a thermosetting foam for many of the same purposes as cited in the '718 patent.

"Ken-React Reference Manual", 1987, Kenrich Petrochemicals, Inc. Bayonne, N.J., "Synergistic Dispersion Effects in Zeolite Performance" describes use of organo-titanates to improve the effectiveness of Molecular Sieves in rigid polyurethane foam formulations. The zeolites are used to absorb traces of moisture which would react with isocyanate to produce carbon dioxide during the manufacture of closed cell, rigid urethane insulating foam and thereby reduce the K-factor and K-factor stability of the thermal insulating foam.

U.S. Pat. No. 4,539,049, concerns organo-zirconates useful in the same way as the products described immediately above.

U.S. Pat. No. 4,288,559, concerns impregnating preformed urethane foams with a dispersion latex containing surfactants, aluminum trihydrate and zeolite.

West German Patent DE 35 3671, concerns impregnating foam with a natural rubber or chloroprene latex which contains magnesium oxide or zinc oxide sufficient to neutralize any carboxylic acids stabilizing the latex and ca. 20 percent by weight aluminum trihydrate.

U.S. Pat. No. 3,326,844, concerns bubble-free polyurethane coatings containing zeolites such as Molecular Sieve 4A.

Japanese Patent Number 57/51728, concerns closed cell, rigid thermal insulating foam made by absorbing at least part of the blowing agent, e.g. a fluorocarbon, in a zeolite.

Japanese Patent Number 57/49628, concerns rigid foams with low thermal conductivity containing about 15 percent of zeolite.

Japanese Patent Number 56/41233, concerns use of zeolites as absorbants for gaseous blowing agents in making closed cell insulating foam.

Japanese Patent Number 54/39857, concerns blending clay mineral having combined water, evolvable at high temperature, and a boric acid or silicic acid salt in a urethane foam formulation to give fire-resistant thermal insulating foam. The mineral can be a zeolite and the salt can be sodium metaborate.

Japanese Patent Number 52/63997, concerns making foams from polyether triol-TDI prepolymer. 100 parts of the prepolymer and 20 parts water and 3 parts of zeolite produced a foam which was softer than if the zeolite had been omitted.

German Patent DE 1804362, concerns use of a sodium aluminosilicate zeolite together with MDI, CF3 blowing agent and catalysts and polyether to form cellular structures with compact surfaces and densities in the range of 6 lb/cu.ft.

Because of the wide use of urethane foams in home and commercial furnishings as well as in transportation, there has been an increasing emphasis on the health and safety aspects of this usage. Of particular concern has been ignition sensitivity and combustibility resistance of these products. These combustibility issues have been met by incorporation of fire retardants into the foams. These fire retardant additives are principally halogen/-phosphorus containing compounds, often chlorinated or brominated phosphorus esters. While these additives have served their purposes well, there is growing concern over increased levels of smoke generation, rather than actual flaming, and the safety aspects of pyrolysis products which are at least noxious and often potentially toxic.

Accordingly, there has been a recognized need for a superior way of providing fire retardancy, i.e. advanced combustion resistance. This need is evident in the stringent requirements currently a part of various countries' fire codes, as well as established test procedures.

OBJECTIVES OF THE INVENTION

A principle objective of this invention is to make water-blown polyurethane foams which have both high comfort and load-bearing characteristics by both molded and slab manufacturing processes, and which will pass current combustion resistance tests with no conventional flame retardant additive.

Another objective of the invention is to provide for increased safety through the reduction in the ignitability of water blown polyurethane.

Another objective of the invention is to provide for increased safety through the use of low-load efficiency additives which provide the increased combustion resistance.

A further objective is to provide smoldering resistance as well as greatly lowering the ignitability of water-blown polyurethane foams for use in home and office furnishings and transportation applications.

SUMMARY OF THE INVENTION

The present invention provides water-blown, polyurethane foams modified by incorporation of specific zeolites at levels of from about 0.5 to ten parts per hundred parts polyol. These zeolite-containing foams have been found to exhibit excellent combustibility properties while greatly reducing or eliminating conventional flame retardant additive in the foam. This advanced level of combustion resistance is entirely unexpected from the prior art. The foams fulfill a long-standing need for a high level of combustion resistance in flexible polyurethane foams for uses such as home and office furnishings and in transportation.

DETAILED DESCRIPTION OF THE INVENTION

In accordance with the present invention, the zeolite employed must be an active zeolite. Zeolites are naturally occurring aluminosilicate minerals and are also prepared synthetically. They are structurally distinct from clays such as Bentonite and Montmorillonite which do share some of the same absorbent and ion exchange applications. The zeolites have been extensively characterized by their crystallographic structure as determined by x-ray diffraction. There are synthetic aluminosilicates which are crystallographically amorphous. These amorphous "zeolites" are often made for their ion exchange or pigment properties and are generally termed "permutites".

In addition to crystallographic characterization by x-ray diffraction, infrared spectroscopy has been used to confirm structural details and to define the water associated in various ways with the basic aluminosilicate structure.

Zeolites are crystalline, hydrated aluminosilicates of Group I and Group II elements. As found in nature or made synthetically, zeolites are aluminosilicates of sodium, potassium, magnesium, calcium, strontium and barium. Higher valence cations such as those of the rare earths are easily made by cation exchange. Zeolites are "framework" structures made up of "infinitely extending" networks of AlO$_4$ and SiO$_4$ tetrahedra joined by the sharing of all oxygen atoms. They may be represented by the empirical formula $$M_{n/2} \cdot Al_2O_3 \cdot xSiO_2 \cdot yH_2O$$

In this oxide formula, x is usually greater than 2 because AlO$_4$ tetrahedra are joined only to SiO$_4$ tetrahedra. "n" is the cation valence. The framework contains voids, interconnected channels or cavities of controlled or uniform size and geometries. These voids or channels are occupied by the cations and water molecules. The cations are mobile and can be exchanged by other cations. The intercrystalline water can be removed continuously and reversibly.

The synthetic zeolites have found extensive uses because of the ways in which the aluminosilicate structure can be controlled during synthesis and specific cations included to closely control pore size. The uses include highly selective absorbents, catalysts, particularly in petroleum hydroforming processes, and pigments. The synthesis of zeolites, the structural characterization and many uses of zeolites are described in *Zeolite Molecular Sieves: Structure, Chemistry and Use*, D. W. Breck, R. E. Krieger Publishing Company, Malabar, Fla. (1984), reprinted with revisions by arrangement with John Wiley and Sons, New York (1974).

Zeolites X and Y (also known as Molecular Sieves) have topologically similar aluminosilicate framework structures, although they are distinct species. The unit cells are cubic and contain 192 SiO$_4$ and AlO$_4$ tetrahedra. The zeolites are distinguished on the basis of chemical composition, structure and their related physical and chemical properties. Differences are found in the cation and cation distribution, the Si/Al ratio and possible ordering of the tetrahedral sites.

In zeolites X and Y, the relationship between the number of tetrahedral Al atoms, N$_{Al}$, and the Si/Al ratio is $$N_{Al} = 192/(1+R) \quad R = N_{Si}/N_{Al}$$

"N$_{Si}$" is the number of tetrahedral Si atoms. The number of aluminum atoms in the unit cell of the X Zeolites varies between 96 and 77, and R between 1 and 1.5. In the Y Zeolites, the number of aluminum atoms in the unit cell varies between 76 and 48, and R between 1.5 and 3.0.

13X is an "X"-type synthetic Molecular Sieve. A sodium zeolite obtained as a fine powder with a SiO$_2$/Al$_2$O$_3$ ratio of 2.5, a pore size of about one nanometer and a particle size of about 10 microns.

ZLD 4040 is a Molecular Sieve, obtained as a fine powder which is a 13-X-type zeolite but with a particle size of about 4 microns.

ZLD 4040 (activated 13X-type) is a ZLD-4040 zeolite which as been heated to 800° C. to drive water from the structure.

10X is an X-type synthetic zeolite obtained as a fine powder with a pour size of about one nanometer and characterized by a slurry pH of about 6.5.

LZY-52 (Y-zeolite) - is a Y-type sodium synthetic zeolite obtained as a fine powder. It has a pore size of about 0.8 nanometes and a SiO$_2$/Al$_2$O$_3$ ratio of about 4.8.

Y-52 LZY-52

LZ 10 (proton exchanged) is a Y-52 -type synthetic zeolite which had been treated with ammonia and then "steamed" to exchange the cation, sodium, for hydrogen. The product has little "accessible sodium" for reaction.

The unit cell of the type-A zeolites contains 24 tetrahedra, 12 AlO$_4$ and 12 SiO$_4$. When fully hydrated, there are 24 water molecules in the "oxide formula". Normally, A-type zeolites are synthesized in the Na (sodium)-form. Other cations are readily prepared by ion exchange from aqueous solution. The Si/Al ratio may be slightly different from 1.0. The range may be 0.7 to 1.2; typically SiO$_2$/Al$_2$O$_3$ may be about 1.92.

3A is an "A-type" synthetic potassium zeolite obtained as a fine powder. The zeolite has a pore size of about 0.3 nanometers and a SiO$_2$/Al$_2$O$_3$ ratio of about 1.0.

4A (activated) - is an "A-type" synthetic sodium zeolite obtained as a fine powder with a pore size of about 0.4 nanometers and a SiO$_2$/Al$_2$O$_3$ ratio of 1.0 which has been heated at 800° C. to drive water from the structure.

ZLD 1000 (CO$_2$ loaded) - is a 4A-type synthetic sodium zeolite obtained as a fine powder which has been "activated" then exposed to a CO$_2$ atmosphere to load the pores with carbon dioxide.

ZLD 1000 (H$_2$O loaded) - a "4A-type" synthetic sodium zeolite obtained as a fine powder which has been "activated" by heating to 800° C. and exposed to high humidity to allow water to reenter the zeolite structure.

ZLD 1000 (activated) - a synthetic zeolite similar to 4A (activated).

5A is an "A-type" synthetic calcium zeolite obtained as a fine powder. This zeolite has a pore size of about 0.5 nanometers and a SiO$_2$/Al$_2$O$_3$ ratio of about 2.0.

ZLD 1500 (CO$_2$ loaded) - is a "5A-type" synthetic calcium zeolite which has been "activated" by heating to 800° C. and then exposed to an atmosphere of carbon dioxide.

Mordenites have a Si/Al ratio of about 5.0 and are the highest silica content zeolite minerals. Each silicon and aluminum tetrahedron belongs to one or more five numbered rings in the aluminosilicate framework. The typical oxide formula is Na$_2$O.Al$_2$O$_3$.10 SiO$_2$.6H$_2$O The Si/Al ratio may vary from 4.17 to 5.0 and higher. "Catalytically Inactive" means that the zeolite is not an active catalyst in hydrocracking in petroleum processing.

Mordenite M-5 is a synthetic sodium Mordenite-type zeolite with a pore size of about 0.7 nanometers and a SiO$_2$/Al$_2$O$_3$ ratio of about 5.4.

"Silicalite" is the highest silicon content synthetic zeolite and the most hydrophobic. It is used to scavenge (absorb) organics from aqueous systems. The Si/Al ratio is very high. "catalytically inactive" means that the zeolite is not an active catalyst in hydrocracking in petroleum processing.

SA-115 "Silicalite" ("catalytically inactive")-is a very high silica content synthetic zeolite obtained as a fine powder with a pore size of about 0.6 nanometers.

ZEOLEX synthetic zeolites which are classified as amorphous by X-ray diffraction analysis, are sold by J. M. Huber Corp., Chemicals Division, of Etowah, Tenn. as titanium dioxide pigment extenders. (see S. K. Wasson, 38th Conference, Reinforced Plastics/Composites Institute, The Society of Plastics Industry, Inc. Feb. 7-11, 1983, *Symposium Proceedings*.; J. W. Maisel, *Proceedings of SPE 45th Annual Technical Conference*, 1987.)

ZEOLEX 80 amorphous sodium aluminum silicate obtained from J. M. Huber Corp. characterized by a "slury pH" (see below) of about 7.0. ZEOLEX 80 is described as a "low structure zeolite" on the basis of an oil absorption test (S. K. Wasson, "Unique Synthetic Sodium Aluminum Silicates [SSAS] as Pigment/Colorant Extenders and Property Enhancers in Plastics", 38th Conference, Reinforced Plastics Institute, SPI, Inc. Feb. 7-11, 1983, Table 1).

ZEOLEX 35P amorphous sodium aluminum silicate obtained from J. M. Huber Corp. characterized by a "slurry pH" (see below) of about 9.0. ZEOLEX 35 is described as a "very low structure zeolite" on the basis of an oil absorption test, see S. K. Wasson reference, above (ZEOLEX 80).

ZEOLEX 23A amorphous sodium aluminum silicate obtained from J. M. Huber Corp. characterized by a water slurry pH (see below) of about 9.0. ZEOLEX 23 is described as a "medium structure zeolite" on the basis of an oil absorption test, see S. K. Wasson reference above (ZEOLEX 80)

ALPO-5 An experimental Molecular Sieve containing phosphorus obtained as a fine powder from Union Carbide Corporation. Chemically described as an aluminophosphate, this phosphate-containing synthetic zeolite is a large pore, single channel Molecular Sieve. (see D. W. Breck, *Zeolite Molecular Sieves*, pages 322-328, Robert E. Krieger Publishing Co., Malabar, Fla. (1984)). The sieve contains Al$_2$O$_3$, P$_2$O$_5$ but no cation.

SAPO-5 An experimental Molecular Sieve containing phosphorus is obtained as a fine powder from Union Carbide Corporation Chemically described as a silicoaluminumphosphate, this phosphate containing synthetic zeolite is a large pore, single channel Molecular Sieve. (see D. W. Breck, *Zeolite Molecular Sieves*, pages 322-328, Robert E. Krieger Publishing Company, Malabar, Fla. (1984)). The sieve contains P$_2$O$_5$, Al$_2$O$_3$, and SiO$_2$ and hydrogen ion as the cation.

By active what is meant are those zeolites characterized by having water-slurry pH in the range and above, preferably 7 to 11, and by having strong, surface infrared hydroxyl absorbance in the range of 3400-3600 cm.$^{-1}$. While not firmly established, one can speculate that infrared absorbance in this range is probably due to hydroxyl to inorganic oxygen hydrogen bonding. Data supporting this characterization of active zeolites are provided in Tables 1 and 2. Preferably the zeolite is selected from the group of crystalline zeolites consisting of Molecular Sieves 13X, ZLD 4040, Mordenite M-5, LZY-52 and Y-54, manufactured and sold by Union Carbide Corporation; or amorphous zeolites, as measured by X-ray diffraction, selected from the group consisting of "ZEOLEX 80", "ZEOLEX 35", and "ZEOLEX 23", manufactured and sold by J. M. Huber Co. Highly preferred zeolites are LZY-52 and "ZEOLEX 80".

The zeolites are used in the water-blown foam formulations at concentration levels of from about 0.5 to 10.0 parts per hundred parts polyol. Preferably from about 0.5 to about 5 parts per hundred parts of polyol. Most preferably 1 to 3 pHp. The zeolites may be intensively mixed with the base polyol or polymer polyol just prior to use. Alternatively, the zeolites may be surface treated to give more stable dispersions in polyol, whereupon they may be premixed with polyol or polymer polyol sometime before use. Modes of surface treatment will be made clear by examples which follow.

Flexible, water-blown polyurethane foams are prepared using conventional procedures, descriptions of which can be found in: *Urethane Chemistry and Applications*, K. N. Edwards, Ed., ACS Symposium Series No. 172, American Chemical Society, Washington, D.C. (1981), Chapter 11, F. E. Bailey, Jr. and F. E. Critchfield, pg. 127; *Polyurethane Handbook*, G. Oertel, Ed. Hanser Publishers, Munich and New York (1985), Chapter 5; F. E. Bailey, Jr., M. W. Jorgenson and R. W. Whitman, U.S. Pat. No. 4,686,240 Aug. 11, 1987.

Base Polyols

The polyol, or blends thereof, employed as the base polyol depends upon the end use of the polyurethane product to be produced. The molecular weight or hydroxyl number of the base polyol will thus be selected. The hydroxyl number of the polyol or polyols employed can accordingly vary over a wide range. In general, the hydroxyl number of the polyols employed may range from about 20 or lower to about 70 and higher. As a further refinement, the specific foam application will likewise influence the choice of base polyol. As an example, for molded foam, the hydroxyl number of the base polyol may be on the order of about 20 to about 40, and for slabstock the hydroxyl number may be on the order of about 25 to about 70.

The hydroxyl number limits described above are not intended to be restrictive, but are merely illustrative of the large number of possible combinations for the polyol or polyols used.

The hydroxyl number is defined as the number of milligrams of potassium hydroxide equivalent to the hydroxyl content of one gram of polyol. The hydroxyl number can also be defined by the equation:

$$OH = (56.1 \times 1000 \times f)/m.w.$$

where
OH = hydroxyl number of the polyol
f = functionality, that is, average number of hydroxyl groups per molecule of polyol
m.w. = number average molecular weight of the polyol.

Substantially any of the polyols previously used in the art to make urethanes can be used as the base polyol in this invention. Illustrative of the polyols useful in producing compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) alkylene oxide adducts of polyhydroxyalkanes;
(b) alkylene oxide adducts of nonreducing sugars and sugar derivatives;
(c) alkylene oxide adducts of phosphorus and polyphosphorus acids;
(d) alkylene oxide adducts of polyphenols;
(e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4 dihydroxybutane, 1,4-, 1,5- and 1,6-dihydroxyhexane, 1,2-, 1,3- 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation productions of phenol and formaldehyde, and novolac resins; condensation products of various phenolic compounds and acrolein; the simplest member of this class being 1,2,3-tris(hydroxyphenyl) propanes, condensation products of various phenolic compounds and glyoxal, glutaraldehyde, and other dialdehydes, the simplest members of this class being the 1,1,2,2-tetrakis (hydroxyphenyl) ethanes, and the like.

Indeed, any material having an active hydrogen as determined by the Zerewitinoff test may be utilized as the base polyol. For example, amine-terminated polyether polyols are known and may be utilized, if desired.

The most preferred base polyols employed in this invention include the poly(oxypropylene) glycols, triols, and higher functionality polyols, and the like that are capped with ethylene or propylene oxide as dictated by the reactivity requirements of the particular polyurethane application. Generally, the nominal functionality of such polyols will be in the range of about 3 or greater. These polyols also include poly(oxypropyleneoxyethylene) polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain.

As is well known in the art, the polyols that are most preferred herein contain varying small amounts of unsaturation. Unsaturation in itself does not affect in any adverse way the formation of the polyurethanes in accordance with the present invention except in the case where the extent or type of unsaturation is so high as to result in a highly crosslinked polymer/polyol or gel.

The key limitation to the polyol employed is that it should be principally of the primary type, as opposed to secondary or tertiary. A principally primary hydroxyl polyol has at least 50 percent of the hydroxyl groups on the polyol primary hydroxyls. The preferred polyols have more than 70 percent primary hydroxyls.

Polymer/Polyol

In addition to the base polyol a polymer polyol may be employed. The polymer/polyols of this invention are produced by polymerizing the monomer system used in the presence of a free radical catalyst in the base polyol and a stabilizer. Conceptually, a wide variety of monomers may be utilized in the preparation of the polymer/polyols. Numerous ethylenically unsaturated monomers are disclosed in the prior art. Any of these monomers should be suitable.

The selection of the monomer or monomers used will depend on considerations such as the relative cost of the monomers and the polyurethane product characteristics required for the intended application. To impart the desired load-bearing to the foams, the monomer or monomers used in preparing the polymer/polyol should, of course, desirably be selected to provide a polymer which has a glass transition of at least slightly higher than room temperature. Exemplary monomers include styrene and its derivatives such as para-methylstyrene, acrylates, methacrylates such as methyl methacrylate, acrylonitrile and other nitrile derivatives such as methacrylonitrile, and the like. Vinylidene chloride may also be employed.

The preferred monomer mixtures used to make the polymer/polyol are mixtures of acrylonitrile and styrene or acrylonitrile, styrene and vinylidene chloride.

As the amount of styrene or its derivatives in the monomer mixture is increased above about 70 weight percent or so, it becomes increasingly more difficult to make satisfactorily stable polymer/polyols. Additionally, at such high styrene levels, problems other than stability are also typically encountered. These problems include a decrease in conversion of the styrene monomer and the concomitant need to adequately strip the styrene monomer, as well as an increase in the viscosity of the polymer/polyol. Despite these drawbacks, levels of styrene greater than 75 weight percent and even as high as 100 weight percent may be desirable.

The monomer content will be typically selected to provide the desired solids content required for the anticipated end use-application. In general, it will usually be desirable to form the polymer/polyols with as high a resulting polymer or solids content as will provide the desired viscosity and stability properties.

The stabilizer should be added to the base polyol in an amount sufficient to provide the desired stability assistance for the resulting polymer/polyol. It will generally be suitable to incorporate a stabilizer in amounts up to perhaps about 30 percent or so, based upon the weight of the polyol. Levels from about 1 percent to about 20 percent by weight or so should generally be suitable for polymer/polyols. If desired, a mixture of stabilizers can, of course, be used.

The polymer/polyols of the present invention are preferably prepared utilizing the process set forth in Priest et al. U.S. Pat. No. 4,208,314. In accordance with that process, a low monomer-to-polyol ratio is maintained throughout the reaction mixture during the polymerization process. Such low ratios are achieved by employing process condition that provide rapid conversion of monomer to polymer. In practice, a low monomer-to-polyol ratio is maintained, in the case of semi-batch and continuous operation, by use of a free radical polymerization catalyst, by control of the temperature and mixing conditions and, in the case of semi-batch operation, by slowly adding the monomers to the polyol.

The mixing conditions employed are those attained using a back-mixed reactor (e.g., a stirred flask or stirred autoclave). Reactors of this type keep the reaction mixture relatively uniform and so prevent localized high monomer-to-polyol ratios. However, tubular reactors may be employed if they are modified so that increments of the monomer are added to various stages.

The utilization of the Priest et al. process is preferred since this allows the preparation of polymer/polyols with a wide range of monomer composition, polymer contents, and base polyol that could not be otherwise prepared with the necessary stability now often desired. However, whether the utilization of the Priest et al. process is essential depends upon whether the process parameters are such that a satisfactory polymer/polyol can be prepared without using this process.

Other processing technology is disclosed in the prior art and may likewise be used in the preparation of the polymer/polyols of the present invention. For example, the techniques set forth in U.S. Pat. Nos. 4,119,586 and 4,148,840 may be employed, if desired.

Control of residence time has been found useful in controlling both the degree of crosslinking (XLC) and the intrinsic viscosity of the polymer which, as mentioned in U.S. Pat. No. 4,652,589, may be advantageous. In a continuous operation, a stable dispersion of a polymer in a polyol is produced where the residence time, which is defined as that time calculated by dividing the reactor's volume by the volumetric flow rate of the total feed to the reactor, is from about 1 minute to about 5 hours, and preferably, from about 10 minutes to about 2 hours.

In a semi-batch operation where the reactor can be partially charged prior to initiating polymerization, the term residence time refers to that period of time during which significant polymerization of the monomer or co-monomers occurs. In semi-batch operation, residence times from about 30 minutes to about 10 hours are recommended.

Catalysts useful in producing the polymer/polyols are the free radical type, vinyl polymerization catalysts such as the peroxides, percarbonates, and the azo compounds. Any other suitable catalyst may be employed. Azo catalysts such as azobis(isobutyronitrile) are the preferred catalysts. 2,2'-azobis(isobutyronitrile) is particularly preferred because it does not increase the acid number of the product, does not impart objectionable odor to the product, and does not require special handling, particularly as compared to certain peroxide catalysts.

The catalyst concentration can be varied within reasonably wide limits. The catalyst concentration will, accordingly, typically be adjusted to optimize the polymer/polyol properties. Accordingly, the concentration will generally be in the range of about 0.1 to about 3 weight percent based on the total feed to the reactor. The preferred amount of catalyst will be in the range of about 0.2 weight percent to about 1.0 weight percent. Up to a certain point, increases in the catalyst concentration result in increased monomer conversion but further increases do not substantially increase conversion. Conversions of monomers to polymers which can be typically achieved are on the order of 75% to 98% of the monomer charged. On the other hand, increasing catalyst concentration increasingly improves product stability. The catalyst concentration selected will usually be an optimum value considering all factors, including costs.

The temperature used in producing polymer/polyols is not in itself critical and can be any temperature at which the selected catalyst has a reasonable rate of decomposition under the reaction conditions. Typically, in continuous processes, reaction temperatures of from about 100° C. to about 150° C. may be used, the preferred range being from about 100° C. to about 125° C. It has been found that with higher reaction temperatures there is a tendency for the intrinsic viscosity of the polymer to decrease.

Further, the addition of a polymer control agent during the polymerization reaction has been found to be useful. In general, as used herein, the terminology polymer control agent connotes a low molecular weight liquid which, upon use in preparing the polymer/polyol, results in polymer structure such that the polymer has low crosslinking coefficient and controlled intrinsic viscosity. Virtually any low molecular weight liquid should be suitable. A variety of low molecular weight carbon-hydrogen compounds are known and may be employed. The suitability of a particular liquid may be readily determined simply by employing the liquid in the polymer/polyol preparation. Accordingly, low molecular weight liquids may be employed regardless of whether any significant chain transfer activity is exhibited.

Low molecular weight liquids not conventionally viewed as chain transfer agents but useful as polymer control agents include water, cyclohexane, and benzene. Suitable polymer control agents which are conventionally viewed as chain transfer agents include ketones, alcohols, aldehydes, halogenated compounds, benzene derivatives and the like.

Any such known chain transfer agents can be utilized as the polymer control agents, if desired.

The polymer control agent or agents used should be added in an amount that will provide a polymer having the desired properties. Suitable levels will, of course, vary as discussed herein. Amounts up to 20 weight percent or higher, based on the total feed to the reactor, may be used satisfactorily. More typically, useful levels will be about 2 to 10 percent or so.

The viscosity of the polymer/polyol compositions can vary over a wide range, depending upon the limitations and requirements of the particular end use application. As a practical matter, it is generally desired to minimize the viscosity for obvious reasons. When the viscosity gets too high, it becomes difficult to handle the polymer/polyol, particularly in off-loading, mixing, and the like. In general, it is desired that the viscosity of the resulting polymer/polyol be less than about 10,000 cps at 25° C.

The viscosity of the resulting polymer/polyols will also typically vary depending upon the intended polyurethane application. In high resiliency molded foam applications where solids contents on the order of 25 to 45 weight percent or so are often used (typically diluted with conventional polyols in commercial formulations), the viscosities of the thus-diluted polymer/polyols will typically be in the 3500 to 5000 cps (25° C.) range or higher. In slabstock applications where solids contents of 35 to 60 percent by weight or more are desired and the polymer/polyols are sometimes used neat, the viscosity will typically be above about 3500 cps (25° C.) or so, often ranging up to 8000 cps (25° C.) or so.

The polymer/polyol may, if desired, be blended with conventional polyols or the like to reduce the polymer content to the level required for the particular end-use application. Blends in which the resulting polymer content is as low as 4 percent of the total weight of the blend, or even less, are useful.

Polyisocyanate

The organic polyisocyanates that are useful in producing polyurethane products in accordance with this invention are organic compounds that contain at least two isocyanato groups. Such compounds are well-known in the art. Suitable organic polyisocyanates include the hydrocarbon diisocyanates e.g., the alkylene diisocyanates and the arylene diisocyanates, as well as known triisocyanates and polymethylene poly(phenylene isocyanates). Examples of suitable polyisocyanates are 2,4-diisocyanatotoluene, 2,6-diisocyanatotoluene, methylene bis(4-cyclohexyl isocyanate), 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl)ether of 1,4-butylene glycol, 1,11-diisocyanatoundecane, 1,12-diisocyanatododecane bis-(isocyanatohexyl) sulfide, 1,4-diisocyanatobenzene, 3,5-diisocyanato-o-xylene, 4,6-diisocyanato-m-xylene, 2,6-diisocyanato-p-xylene, 2,4-diisocyanato-1-chlorobenzene, 2,4-diisocyanato-1-nitrobenzene, 2,5-diisocyanato-1-nitrobenzene, 4,4-diphenylmethylene diisocyanate, 3,3-diphenyl-methylene diisocyanate, and polymethylene poly (phenyleneisocyanates), and mixtures thereof. The preferred polyisocyanates are TDI, a mixture of 80% 2,4 - tolylene diisocyanate and 20% 2,6 - tolylene diisocyanate and MDI, 4,4'diphenylmethane diisocyanate or its derivatives. Such derivatives include liquid forms as described in U.S. Pat. No. 3,344,164 and so called modified forms as described in U.S. Pat. No. 3,152,162. The polyisocyanate employed is present in an amount sufficient for there to be a NCO Index in the range of 85 to 120, preferably 90 to 110.

Catalyst

Any known catalysts useful in producing polyurethanes may be employed. Representative catalysts include: (a) tertiary amines such as bis(2,2'-dimethylamino)ethyl ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo-[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2(N,N-dialkylamino)alkanols, such as the well-known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide) dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The total catalysts (amine plus metal) are employed in small amounts, for example, from about 0.05 to 2 parts per hundred parts of polyol. For the purposes of the present invention it is preferred to employ metal catalysts (such as a tin gel catalyst) at a level less than 0.1 parts per hundred parts of polyol, preferably 0.05 parts or less.

Blowing Agent

When forming a polyurethane foam, a small amount of a blowing agent is employed in the reaction mixture. Suitable blowing agents, for example, include water from about 0.5 to about 8 parts per hundred parts of polyol. Preferably, the water is present in an amount ranging from 2 to 6 parts per hundred parts of polyol. Other suitable blowing agents which are vaporized by the exotherm of the reaction are known but are not preferred for the present invention. The generally preferred method of foaming for producing flexible foams is the use of water. A combination of water plus a fluorocarbon blowing agent such as trichloromonofluoromethane may also be used. The quantity of blowing agent employed will vary with factors such as the density desired in the foamed product. However, foams with densities in the range of 1.6 lb/cu. ft or less can be made using water as the sole blowing agent in practicing this invention.

The scorch-free properties of the foams produced are most evident when the blowing agent is water, and the water is used in an amount that results in a foam having a density less than 3.0 pounds per cubic foot.

Stabilizer

It is also within the scope of the invention to employ, when applicable, small amounts, e.g., about 0.001 percent to 5.0 percent by weight, based on the total reaction mixture, of a foam stabilizer. Suitable foam stabilizers or surfactants are known and may vary depending upon the particular polyurethane application. One useful class of foam stabilizers are the "non-hydrolyzable" polysiloxane-polyoxyalkylene block copolymers such as the block copolymers described in U.S. Pat. Nos. 3,505,377 and 3,686,254.

Other Foam Additives

It is likewise within the scope of the present invention to employ other foam additives conventionally used in the art. In particular, it has been found that the addition, to the foam formulation of the present invention, of aliphatic chlorinated compounds can improve the set or compression properties of the foam. Such materials should be added in sufficient quantities so that from 0.5 to 5 parts of aliphatic chlorine per hundred parts of polyol are employed in the formulation. Suitable chlorinated materials include chlorinated paraffin, Hydrin TM-10 and polyols such as PF set forth in the examples. Melamine may also be a useful foam additive, acting to improve the heat aging of the foam. It should be added in an amount ranging from 2 to 10 parts per hundred parts of polyol, preferably 5 to 10 pHp.

The compositions of this invention find particular utility in the production of high resiliency molded foams for use in arm rests, mattresses, automobile seats, and the like, as well as in slabstock foams for use in mattresses, furniture cushioning, carpet underlayment and the like.

The foams which are produced may be "tight" foams. As is known in the polyurethane art, tight foams usually require crushing immediately after production. For a molded foam, this procedure may mean passing the foam part between crushing rollers after demold or venting the mold at a specific moment in the cure cycle to burst the cells. Mechanical procedures for crushing of slab foams have similarly been described.

Physical properties of molded and slab foams have been determined by standard physical testing procedures. See A.S.T.M. Standard D-3574; comparable methods are described by the International Standards Organization: see ISO Standards 1798, 2439, 3386, and 5999.

Combustion resistance of foams produced in accordance with this invention and foams made for comparative purposes have been tested using two principal procedures. For molded foams, a horizontal burning test has been used, Federal Motor Vehicle Safety Standard No. 302. For the preferred practice of this invention, foams self-extinguish in the FMVSS-302 procedure within 15 seconds of ignition. The zeolite modified molded foams will also pass CAL 117 A & D, Bulletin 117 of the State of California Department of Consumer Affairs. While not a requirement currently for automotive seating foams, CAL 117 is required for molded furnishing foams. Current commercial molded foam systems do not pass this test without adding halogen and/or phosphorus flame retardants.

For slab foams, a vertical burning test has been used, CAL 117 A and D, and the ratings described are in terms of seconds of burning after the ignition source is removed and char length in inches. In the preferred practice of this invention, foams self-extinguish in the CAL 117A test essentially immediately after the ignition source is removed from the foam. The smoldering test is performed as described in CAL 117, part D.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

Definitions

| | |
|---|---|
| CATALYSTS: | |
| CA: | a blend of 70% of bis(2-dimethylamino-ethyl) ether in dipropylene glycol sold by Union Carbide as "A-1". |
| CB: | a blend of 33% triethylenediamine and 67% dipropylene glycol sold by Union Carbide as "A-33". |
| CC | blend of 25% of catalyst A and 75% of 1,4-diazobicyclo-[2.2.2]octane (sold by Air Products and Chemicals Co. as "DABCO-33-LV"). |
| CD | dibutyltin dialaurylmercaptide sold by M&T Industries as M&T 120. |
| CF | dibutyltin dilaurate |
| CG | stannous octoate, T-9. |
| CH | stannous octoate, D-9. |
| CI | stannous octoate, D-19. |
| CROSSLINKER-FOAM STABILIZERS: | |
| DEOA: | diethanolamine, dihydroxyethylamine |
| SURFACTANTS: | |
| SA | a non-hydrolyzable silicone surfactant manufactured and sold by Union Carbide Corporation as Y-10366 for use in HR polyurethane foams. |
| SB | a silicone surfactant manufactured and sold by Union Carbide Corporation as Y-10506 intended for flexible foams. |
| SC | a non-hydrolyzable silicone surfactant manufactured and sold by Union Carbide Corporation as Y-10561 for use in HR polyurethane foams. |
| SD | a non-hydrolyzable silicone surfactant manufactured and sold in Union Carbide Corporation as L-5309 for use in HR polyurethane foams. |
| SE | a hydrolyzable silicone surfactant manufactured and sold by Union Carbide Corporation as L-6202 for use in flexible, slab polyurethane foam. |
| POLYOLS AND POLYMER/POLYOLS: | |
| PA | an alkylene oxide triol which is the propylene oxide/ethylene oxide adduct of glycerine tipped with propylene oxide to produce a principally secondary hydroxyl terminated polyol with a hydroxyl number of 52 mg. KOH/g.. |
| PB | an alkylene oxide triol which is the ethylene oxide/propylene oxide adduct of glycerine capped with propylene oxide to a hydroxyl number of 58 mg. KOH/g. with a total ethylene oxide content of 10 weight percent. |
| PC | a polyalkylene oxide triol produced by the reaction of propylene oxide with glycerine, then end capped with ethylene oxide to a hydroxyl number of 29 and containing about 13% oxide. |
| PD | a polyalkylene oxide triol produced by the reaction of propylene oxide with glycerine, then end capped with ethylene oxide to a hydroxyl number of about 36. The product contains 16.5% by weight of ehtylene oxide. |
| PE | a polymer polyol which is a 28% solids dispersion of acrylonitrile/styrene copolymer in polyol PD with a hydroxyl number of about 25. |
| PF | a polymer polyol which is 28% solids dispersion of an acrylonitrile/styrene/vinylidene chloride terpolymer in a polyol blend of polyalkylene oxide triols with an hydroxyl number of 20.5 mg. KOH/g and containing 2% epoxidized soybean oil plasticizer. |
| PG | A polymer polyol which is 45% solids dispersion of acrylonitrile/styrene copolymer in a blend of polyether triols with polyol PA with a hydroxyl number of 27 mg. KOH/g. |
| PH | a polyalkylene oxide polyol produced by the reaction of propylene oxide with sorbitol and capped with ethylene oxide to a hydroxyl number of 28 mg. KOH/g |
| PI | a polymer polyol which is a 33% solids dispersion of acrylonitrile/styrene/vinylidene chloride terpolymer in a blend of polyalkylene oxide triols with 2% epoxidized soybean oil plasticizer, the polymer polyol having a hydroxyl number of about 22.4 mg. KOH/g.. |
| PJ | a blend of poly(alkylene oxide) polyether polyols and Polyol PE containing about 11% solids of dispersed acrylonitrile/styrene copolymer and having a hydroxyl number of about 27.5 mg. KOH/g |
| PK | a polymer polyol which is 45% solids dispersion of acrylonitrile/styrene copolymer in a blend of polyalkylene oxide polyols with a hydroxyl number of 27.3 mg. KOH/g. |
| PL | a glycerine started polyalkylene oxide triol which is the propylene oxide adduct end-capped with about 7% of ethylene oxide to a hydroxyl number of 23 mg. KOH/g. |
| PM | Polyol PL which is end capped with about 16% of ethylene oxide. |
| PN | Polyepichlorohydrin, a chlorinated diol, manufactured and sold by B.F. Goodrich as HYDRIN 10 ™. |
| PO | an ethylene oxide capped diol of polypropylene glycol with a molecular weight of about 2000. |
| ISOCYANATES: | |
| TDI 80/20 | a mixture of 80% of 2,4-tolylene diisocyanate and 20% of 2,6-tolylene diisocyanate. |
| TDI 65/35 | a mixture of 65% 2,4-tolylene |

| | -continued |
|---|---|
| Index | diisocyanate and 35% of 2,6-tolylene diisocyanate. The isocyanate index, by convention is 100 times the ratio of free isocyanate groups to isocyanate reactive groups. ie. hydroxyl, amine, water, before reaction takes place. Thus, an isocyanate index of 100 is the exact number of equivalents of isocyanate as the number of equivalents of hydroxyl, amine hydrogens and water in the formulation. Water has two equivalents per mole, a primary amine, two and a secondary amine, one, and an hydroxyl, one. |
| COUPLING AGENTS: | |
| AA | gamma-methacryloxyalkyl tris-alkoxy silane sold by Union Carbide as A-174. |
| AB | Poly (alkylene oxide) alkoxysilane sold by Union Carbide as Y-5560. |
| FOAM ADDITIVES: | |
| melamine | 2,4,6-triamino-s-triazine. |
| "chlorinated paraffin" | a liquid, chlorinated paraffin containing about 40 weight percent chlorine and sold by Diamond Shamrock as Chlorowax ™ 40. |

Method of Measuring Surface Infrared Spectra of Zeolites

Two parts of zeolite and 98 parts of powdered anhydrous potassium bromide are thoroughly mixed and then pressed in a pellet press to form a small button. This button is then examined using an infrared spectrophotometer. Either a dispersive or interferometric (Fourier Transform) spectrophotometer can be used. The infrared spectra obtained is that of the surface of the solid zeolite.

Method of measuring zeolite "slurry pH"

Mix 0.2 grams of zeolite with 40 ml. of distilled water for about ten minutes after which the pH of the slurry is measured. This technique for characterizing the acidity or basicity of reactive or reinforcing fillers in elastomers has been used for many years in the rubber industry to classify carbon blacks, for example.

"Very tight foam"

An observation made when examining a new foam which has not been crushed to open the foam cells. The foam is "hard", i.e. high modulus, until crushed to open the foam cells. At the time is described as "very tight", the foam would have very low porosity.

Blow-off

In a slab, or free-rise polyurethane foam, at the end of foam rise, the gas bubbles, or cells, which have been expanding and causing the foam to rise, burst; that is, there is a thinning of the walls separating touching gas cells which then break, and there is a general exhalation of the gas from the foam structure, which can be seen at the upper foam surface as small bubbles breaking through evenly on the surface, and is termed "blow-off".

Open Cell

The gas cells of the rising foam, the thin walls of which have burst at "blow off", are open cells. An open-celled, flexible polyurethane foam is essentially a continuous network of elastomeric struts and junctures separating these open cells. Open cell foams are characterized by high porosities.

"Verticle Burn Test"

CAL 117A, modified in that the test is run on a sample cut from a block of foam which has been kept at least 24 hours in a constant temperature-humidity room at 75° F. and 55% relative humidity, but not heat aged 24 hours at 104° C. The "vertical burn test" has been used for more rapid screening of test foams and generally is less severe a test than heat aging. CAL 117A requires passage of both procedures: non-heat aged and heat aged.

EXAMPLES

Example 1

This example shows that all molecular sieves and zeolites are not equivalent and that only selected zeolites are effective.

The molded foam test formulation used in the examples are:

| Polyol PD | 65 php. |
|---|---|
| Polyol PE | 35 |
| Water | 4.15 |
| DEOA | 1.5 |
| Zeolite Additive | variable as shown |
| Catalyst CA | 0.16 |
| Catalyst CB | 0.23 |
| Catalyst CD | 0.007 |
| Surfactant SA | 1.4 |
| TDI (105 Index) | 51.24 |

Results of preparing and combustion testing of foams in the Vertical Burn Test are given in the following Tables.

| The Zeolite Present at 3 php. | | | |
|---|---|---|---|
| Zeolite: | Cream/Exit Time, sec. | Foam Quality:* | Burn Test:** |
| Control (no zeolite) | 0/20 | good, white | 10+ |
| 13X (Na cation) | 0/23 | very tight, | 0 |
| 3A (K cation) | 0/18 | very tight | 1.8 |
| 5A (Ca cation) | 0/22 | good, white | 10+ |
| ZLD 1000 (CO$_2$ loaded) | 0/21 | soft, white | 10+ |
| ZLD 1500 (CO$_2$ loaded) | 0/22 | soft, white | 10+ |
| ZLD 1000 (H$_2$O loaded) | 0/17 | very tight, white | 0 |
| ZLD 1000 activated | 0/19 | very tight, white | 8.6 |
| ZLD 4040 (activated 13X type) | −0/18 | very tight, yellow | 2 |
| ZLD 4040 (H$_2$O loaded) | 0/18 | very tight, yellow center | 1.8 |
| LZ 10 (proton exchanged) | 5/42 | soft, white | 10+ |
| S-115 "Silicalite" ("catalytically inactive") | 0/21 | good, white | 10+ |
| M-5 Mordenite ("catalytically inactive") | 0/18 | very tight, white | 0 |
| LZY-52 Y-Zeolite | 0/23 | very tight light yellowish center | 0 |
| ZEOLEX 80*** | 0/20 | very tight, | 0 |

*good = control; "very tight" foams are compared with "soft" foams on demold; yellowish foams had a darker cast toward the center of the foams.
**in the vertical burn test, the specimen extinguished as soon as the flame source was removed = 0, the specimen continued to burn more than ten seconds after the flame source was removed = 10+.
***ZEOLEX 80 is a synthetic zeolite sold as a $TiO_2$ pigment extender, manufactured and sold by J.M. Huber Corp., Chemicals Division, P.O. Box P, Etowah, TN 37331-00616.

The Zeolite Present at 1 php.

| Zeolite: | Foam Quality: | Burn Test:** |
|---|---|---|
| Control (no zeolite) | good, white | 10+ |
| 13X | very tight, slightly yellow | 0 |
| 3A | very tight, white | 10+ |
| ZLD 1000, 4A activated | tight, white | 10+ |
| ZLD 1000, $H_2O$ loaded | tight, white | 10+ |
| ZLD 4040, activated | tight, light yellow | 0 |
| ZLD 4040, water loaded | very tight very slightly yellow | 3.0 |
| M-5, Mordenite | very tight, white | 3.0 |
| LZY-52 | very tight, white | 0 |
| ZEOLEX 80 | very tight, white | 0 |

In the horizontal burn test, FMVSS-302, foams with 1 php. of ZLD 4040, 13X, Mordenite M-5, LZY-52 and ZEOLEX 80 self-extinguished in less than 15 seconds and would have been rated "SE,NBR" ("self-extinguishing, no burn rate").

It is evident that all zeolites are not equivalent in producing combustion resistance in foams. A large number are ineffective. The active zeolites found in this example are Molecular Sieves 13X, ZLD 4040, Mordenite M-5, LZY-52 and the Zeolite ZEOLEX 80. Of these, ZEOLEX 80 and Y-52 are preferred because white foams are obtained which demonstrate combustion resistance when only 1 php. zeolite is present. Mordenite appears to require a slightly higher concentration for an equivalent effect and 13X and ZLD 4040 produce a slightly yellowish tint to the foam center.

Examples 2-5

These examples demonstrate that good quality molded foams are produced from zeolite modified foam formulations.

| | Example: | | | |
|---|---|---|---|---|
| | 2. | 3. | 4. | 5. |
| Polyol PD | 65 php | 65 php | 65 php | 65 php |
| Polyol PE | 35 | 35 | 35 | 35 |
| Water | 4.15 | 4.15 | 4.15 | 4.15 |
| DEOA | 1.5 | 1.5 | 1.5 | 1.5 |
| ZEOLEX 80 | — | 3.0 | — | — |
| LZY-52 | — | — | 3.0 | — |
| LZ-4040 | — | — | — | 3.0 |
| CA | 0.16 | 0.16 | 0.16 | 0.16 |
| CB | 0.23 | 0.23 | 0.23 | 0.23 |
| CD | 0.007 | 0.007 | 0.007 | 0.007 |
| SA | 1.4 | 1.4 | 1.4 | 1.4 |
| TDI (105 Index) | 51.15 | 51.15 | 51.15 | 51.15 |
| Cream Time, Sec | 5 | 5 | 5 | 5 |
| Exit Time, Sec | 33 | 38 | 37 | 33 |
| Tightness | Sl. tight | Very tight | Very tight | Very tight |
| Density, lbs/cu ft. | 1.82 | 1.88 | 1.90 | 1.94 |
| Resiliency, % | 68.0 | 62.0 | 52.0 | 58.0 |
| Porosity, CFM | 40.1 | 12.8 | 32.0 | 37.4 |
| IFD, 25% psi | 34.0 | 37.3 | 31.0 | 36.0 |
| 50% | 60.0 | 65.5 | 57.0 | 59.5 |
| 65% | 92.0 | 98.0 | 88.5 | 91.0 |
| IFD, 25% return | 27.3 | 27.8 | 21.8 | 23.8 |
| IFD 50/25 | 1.76 | 1.76 | 1.84 | 1.80 |
| IFD 65/25 | 2.71 | 2.63 | 2.85 | 2.76 |
| CFD, 50% | 0.48 | 0.49 | 0.41 | 0.46 |
| Tensile, lb/in | 18.5 | 18.1 | 16.8 | 17.0 |
| Elongation, % | 83.5 | 74.9 | 70.5 | 74.9 |
| Tear, lb/in | 1.3 | 1.2 | 1.2 | 1.3 |
| Compression, 75% | 5.7 | 13.3 | 82.1 | 39.3 |
| Humid Age Loss 50 | 10.4 | 59.2 | 78.0 | 78.3 |
| Humid Age Compression Set 50 | 32.0 | 72.6 | 76.5 | 75.0 |

Examples 6-8

These examples demonstrate combustion resistance in active zeolite modified foams.

| | Examples: | | |
|---|---|---|---|
| | 6. | 7. | 8. |
| Poly PD | 65 php | 65 php | 100 php |
| Polyol PE | 35 | 35 | — |
| DEOA | 1.5 | 1.5 | 1.5 |
| Water | 4.15 | 4.15 | 4.15 |
| Catalyst CA | 0.16 | 0.16 | 0.16 |
| Catalyst CB | 0.23 | 0.23 | 0.23 |
| LZY-52 | — | 3.0 | 3.0 |
| Catalyst CD | 0.007 | 0.007 | 0.007 |
| Surfactant SA | 1.4 | 1.4 | 1.4 |
| TDI (105 Index) | 51.15 | 51.15 | 51.15 |
| Appearance on Demold | good | very tight, | very tight, slight yellow |
| FMVS S-302* | 10" | <15 sec. | 1.6"* |
| Vertical Burn, seconds | 10+ | 0 | 0 |

*In the horizontal burn test, FMVSS-302, results are reported in inches of sample burned, ie. 10 inches is the total sample burned. However, in the case that the sample extinguishes immediately after the portion actually in the Bunsen flame is consumed, the result is reported as 15 seconds, the length of time usually required to burn the sample actually in the flame.

Examples 9-10

In these examples formulation catalyst variables are explored in molded foam:

| | 9. | 10. |
|---|---|---|
| Catalyst PD | 65 php | 65 php |
| Catalyst PE | 35 | 35 |
| Water | 4.15 | 4.15 |
| DEOA | 1.5 | 1.5 |
| Glycerine | — | — |
| Sorbitol | — | — |
| LZY-52 | 3.0 | 3.0 |
| Catalyst CA | 0.16 | 0.16 |
| Catalyst CB | 0.23 | 0.23 |
| Catalyst CD | — | — |
| Catalyst CF | 0.1 | — |
| Catalyst CG | — | 0.1 |
| Surfactant SA | 1.4 | 1.4 |
| TDI @ (105 Index) | 51.30 | 51.30 |
| Appearance at DEMOLD | open cell, sl. yel. center | open cell, sl. yel. center |
| FMVSS-302* | 5.25 | 9.25 |
| Vertical Burn, sec. | 0 | 0 |

A deleterious effect of higher tin catalyst levels is found in examples 9 and 10 in the FMVSS-302 test.

Examples 11-13

These comparative examples demonstrate combustion resistance in active zeolite modified "HR-SLAB Foams".

|  | Examples: | | |
|---|---|---|---|
|  | 11. | 12. | 13. |
| Polyol PD | 65 php | 65 php | 100 php |
| Polyol PE | 35 | 35 | — |
| Polyol PH | — | — | — |
| Water | 4.15 | 4.15 | 4.15 |
| DEOA | 1.5 | 1.5 | 1.5 |
| LZY-52 | — | 3.0 | 3.0 |
| Catalyst CA | 0.16 | 0.16 | 0.16 |
| Catalyst CB | 0.23 | 0.23 | 0.23 |
| Catalyst CF | 0.007 | 0.007 | 0.007 |
| Surfactant SA | 1.4 | 1.4 | 1.4 |
| TDI @ (105 Index) | 51.3 | 51.3 | 51.8 |
| Appearance | good | tight foam some foam shrinkage | good foam, tight sl. yl. mod. shrink |
| Vertical Burn, sec. | 10+ | 0 | 0 |

Examples 14-18 demonstrate the physical properties of HR-slab foams and combustion resistance of active zeolite modified HR-slab foams. The use of higher functionality polyol pH is found beneficial for foam stability.

| Physical Properties, Example 14 | |
|---|---|
| Density | 1.8 |
| Resiliency, % | 64 |
| Porosity, CFM | 82.6 |
| IFD, 25% | 21.6 |
| 50% | 36.7 |
| 65% | 57.6 |
| IFD, 25% rt. | 17.9 |
| Return Value | 83 |
| IFD 50/25 | 1.7 |
| FD 65/25 | 2.7 |
| Tensile, psi. | 13.8 |
| Elongation, % | 84 |
| Tear, lb/in. | 0.92 |
| Comp. 50% | 8.45 |

Examples 14-18

|  | Examples: | | | | |
|---|---|---|---|---|---|
|  | 14.** | 15.** | 16.** | 17.** | 18.** |
| Polyol PD | 65 php | 65 php | 49 php | 49 php | 49 php |
| Polyol PE | 35 | 35 | 35 | 35 | 35 |
| Polyol PH | — | — | 16 | 16 | 16 |
| Water | 4.15 | 4.15 | 4.15 | 4.15 | 4.15 |
| DEOA | 1.5 | 1.5 | 1.5 | 1.5 | 0.4 |
| LZY-52 | — | 3.0 | — | 3.0 | 3.0 |
| Catalyst CA | 0.16 | 0.16 | 0.16 | 0.16 | 0.16 |
| Catalyst CB | 0.23 | 0.23 | 0.23 | 0.23 | 0.23 |
| Catalyst CF | 0.007 | 0.007 | 0.007 | 0.007 | 0.007 |
| Surfactant SA | 1.4 | 1.4 | 1.4 | 1.4 | 1.4 |
| TDI @ 105 Index | 51.3 | 51.3 | 51.1 | 51.1 | 48.2 |
| Appearance | control foam | firm, easily crushed, shrinkage evident | soft, easily crushed, slight shrink | resilient feel easily crushed moderate shrinkage | moderate shrinkage, more firm than control foam, example |
| Vertical Burn Test, sec. | 10+ | 0 | 10+ | 0 | 0 |

**duplicate samples submitted for physical properties.

| Physical Properties | | | | |
|---|---|---|---|---|
|  | Examples: | | | |
|  | 15. | 16. | 17. | 18. |
| Density, lb/ft³ | 1.46 | 1.58 | 1.46 | 1.44 |
| Resiliency, % | 57 | 64 | 58 | 58 |
| Porosity, CFM | 59 | 69.7 | 18.5 | 21.2 |
| IFD, 25% | 14.7 | 18.5 | 15.5 | 16.7 |
| 50% | 25.7 | 30.5 | 24.3 | 25.7 |
| 65% | 37.6 | 46.4 | 36.3 | 37.2 |
| IFD, 25% Rt | 10.8 | 10.2 | 11.2 | 12.2 |
| Return Value | 73.3 | 82.3 | 72.7 | 73.2 |
| IFD 50/25 | 1.74 | 1.65 | 1.57 | 1.54 |
| IFD 65/25 | 2.56 | 2.52 | 2.35 | 2.23 |
| Tensile, psi. | 13.4 | 12.8 | 12.6 | 11.8 |
| Elongation, % | 105.8 | 91.3 | 76.8 | 72.4 |
| Tear, lb/in. | 1.13 | 0.95 | 0.97 | 0.95 |
| Comp. 50% | 29.7 | 7.2 | 29.6 | 30.8 |

Examples 19-22

These examples demonstrate that combustion resistance with active zeolite modified foams was not observed in conventional slab foams made from polyols which are principally secondary hydroxyl terminated polyols.

|  | EXAMPLE: | | | |
|---|---|---|---|---|
|  | 19. | 20. | 21. | 22. |
| Polyol B | 100 php | 100 php | 100 php | 100 php |
| ZEOLEX 80 | — | 3.0 | 2.0 | 2.0 |
| LZY-52 | — | — | — | 2.0 |
| Water | 3.0 | 3.0 | 3.2 | 3.2 |
| Catalyst CA | 0.20 | 0.20 | 0.2 | 0.2 |
| Surfactant SE | 1.0 | 1.0 | — | — |
| Surfactant SB | — | — | 1.0 | 1.0 |
| Catalyst CI | 0.2 | 0.2 | 0.2 | 0.2 |
| TDI @ 110 Index | 41.83 | 41.83 | 41.83 | 41.83 |
| Foam Appearance | Full Rise, No shrinkage soft, white | Full Rise, No shrinkage at 100 sec. soft, white | Blow-off observed No shrinkage | Some shrinkage observed |
| Vertical Burn Test**, sec | 10+ | 10+ | 10+ | 10+ |

**10+ indicates that the sample burns for more than 10 seconds after removal of the ignition source.

Examples 23-26

These examples demonstrate combustion resistance with active zeolite modified HR-slab foams:

|  | Examples: | | | |
|---|---|---|---|---|
|  | 23. | 24. | 25. | 26. |
| Polyol PJ | 100 php | 100 php | 100 php | — php |
| Polyol PH | — | — | — | 15 |
| Polyol PE | — | — | — | 38 |
| Polyol PL | — | — | — | 47 |
| ZLD 4040 | — | 3.0 | — | — |
| ZEOLEX 80 | — | — | 3.0 | 3.0 |
| Water | 3.1 | 3.1 | 3.1 | 2.5 |
| DEOA | 1.0 | 1.0 | 1.0 | 1.0 |
| Catalyst CC | 0.25 | 0.25 | 0.25 | 0.25 |
| Surfactant SD | 1.0 | 1.0 | 1.0 | 1.0 |

-continued

| | Examples: | | | |
|---|---|---|---|---|
| | 23. | 24. | 25. | 26. |
| D-19 | 0.06 | 0.06 | 0.06 | 0.06 |
| TDI @ 110 Index | 40.47 | 40.47 | 40.47 | 33.53 |
| Foam Appearance | Full Rise, White, open cell | Full Rise, Shrinkage light tan | Full Rise. Some shrinkage White | Full Rise, White open cell Slight Shrinkage |
| Vertical Burn Testing, sec. | 10+ | 0 | 0 | 0 |

Example 27

In this comparative example, combustion resistance is not observed with a molecular sieve zeolite which has been washed of excess alkali and pH adjusted to 6.5 with washing.

| | 27. |
|---|---|
| Polyol PD | 65 php |
| Polyol PE | 35 |
| Washed 13X (pH = 6.5) | 3.0 |
| Water | 4.15 |
| DEOA | 1.5 |
| Catalyst A | 0.16 |
| Catalyst B | 0.23 |
| Surfactant SA | 1.4 |
| M&T 120 | 0.007 |
| TDI @ 105 Index | 51.15 |
| Cream Time, sec. | 0 |
| Exit Time, sec. | 30 |
| Appearance | Soft foam White, open cell |
| Burn Testing: | |
| Horizontal, FMVSS-302 burn lengths | 10 |
| Vertical, CAL 117, sec. | 10+ |

Examples 28-31

In this set of comparative examples, HR-slab foams were prepared with active zeolite molecular sieve Y-52 varying the ratio of the 2,4-and 2,6 isomers of TDI by blending the normal 80/20 isomer ratio isocyanate with 65/35 ratio TDI.

| | 28. | 29. | 30. | 31. |
|---|---|---|---|---|
| Polyol PJ | 100 | 100 | 100 | 100 |
| LZY-52 | — | 3 | 3 | 3 |
| Water | 3.75 | 3.75 | 3.75 | 3.75 |
| DEOA | 1.2 | 1.2 | 1.2 | 1.2 |
| Catalyst CA | 0.1 | 0.1 | 0.1 | 0.1 |
| Catalyst CB | 0.3 | 0.3 | 0.3 | 0.3 |
| Surfactant SA | 1.0 | 1.0 | 1.0 | 1.0 |
| Catalyst CI | 0.15 | 0.15 | 0.15 | 0.15 |
| TDI, 115 Index | | | | |
| 65/35 | | | 11.2 | 22.4 |
| 80/20 | 44.8 | 44.9 | 33.6 | 22.4 |
| Cream Time, Sec: | 0 | 7 | 6 | 7 |
| Blow Off, Sec. | none | none | none | 95 |
| Shrinkage Rating* | 4 | 2 | 1 | 3 |
| Vertical Burn, sec. | 10+ | 0 | 0 | 0 |

*Shrinkage Rating of Foams: 1 = severe, 4 = slight

Changing the ratio of 2,4- to 2,6 isomers of TDI does not impair combustion resistance of active zeolite modified foam.

Example 32

This example compares the storage stability of dispersions of zeolites in polyether polyols. In particular, storage stability is compared depending on concentration of zeolite in polyol and surface treatment of mode of dispersion preparation. Good dispersions were prepared with zeolites at solids between 25 and 50 percent with zeolites LZY-52, ZLD 4040.

| Surface Treatment: | Zeolite: | Polyol: | Dispersion Solids, %: | Dispersion Stability* |
|---|---|---|---|---|
| tetraethyl-orthosilicate | 13X | PD | 6.25 | separated |
| | ZLD 4040 | | 6.25 | separated |
| | ZLD 4040 | | 26 | good |
| | LZY-52 | | 6.25 | separated |
| | LZY-52 | | 28 | good |
| | ZEOLEX 80 | | 28 | separated |
| | ZEOLEX 80 | PB | 41 | like "putty" |
| | ZLD 4040 | | 43 | good |
| AA | ZLD 4040 | PD | 28 | good |
| AA followed by Making Polyol PE in Polymer Polyol Reactor Mixed with Polyol and then Made Polymer | LZY-52 | PD | 36 | separated |
| Polyol | 13X | PD | 6.25 | separated |
| | ZLD-4040 | PD | 6.25 | separated |
| Y-5560 | LZY-52 | PD | 6.25 | separated |
| | ZEOLEX 80 | PD | 6.25 | separated |
| MLX 483 | ZLD-4040 | PD | 28 | separated |
| High Shear Mixing*** | Y-52 | PD | 50 | good |
| High Shear Mixing*** | Y-54 | PD | 50 | good |

*Dispersion Stability of "good" stood at least two months on the laboratory shelf without separation or layering visible by eye. Solids can be centrifuged out of the dispersion but can be mixed back into dispersion.
**"Separated", usually a visible layering within one or two days of standing.
***Dispersions prepared with high shear mixing with a Cowels Mixer, adding the polyol to the zeolite.

Examples 33-35

These comparative examples demonstrate combustion resistance of active zeolite modified molded and HR slab foams in smoldering testing (CAL 117D).

| EXAMPLE: | 33 | 34 | 35 |
|---|---|---|---|
| | Molded HR Foam | | HR Slab Foam |
| Polyol PD | 65 | 65 php. | 49 php. |
| Polyol PE | 35 | 35 | 35 |
| Polyol PH | — | — | 16 |
| Y-52 | — | 3 | 4 |
| water | 4.15 | 4.15 | 3.75 |
| DEOA | 1.5 | 1.5 | 1.5 |
| Catalyst CB | 0.23 | 0.23 | 0.23 |
| Catalyst CA | 0.16 | 0.16 | 0.16 |
| Catalyst CF | 0.007 | 0.007 | 0.007 |
| Surfactant SA | 1.4 | 1.4 | 1.4 |
| TDI, 105 Index | 51.15 | 51.15 | 51.10 |
| Test Results | | | |
| (Greater than 80% weight retention after smoldering required) | | | |
| % weight retention: | Fail | Pass* 97.5% | Pass 95.2% |

*Control foams, without zeolite, smoldering was terminated after one hour with weight retentions in the range of 40–50 percent determined after termination.

TABLE 1

Water-Slurry pH of Various Zeolites
(0.2 grams of zeolite is mixed with 40 ml. of
distilled water in a small beaker using
a bar magnet stirrer and the pH of
the water slurry is measured.)

| ZEOLITE: | pH: |
| --- | --- |
| LZ-10 | 6.0 |
| ALPO-5 | 6.0 |
| SAPO-5 | 6.0 |
| 10X | 6.5 |
| ZEOLEX 80 | 7.0 |
| LZY-52 | 7.5 |
| M-5 (mordenite) | 7.5 |
| 3A | 8.0 |
| 5A | 8.0 |
| ZEOLEX 35P | 9.0 |
| ZEOLEX 23A | 9.0 |
| 13X | 9.5 |
| ZLD 4040 | 10.5 |
| 4A activated | 10.5 |
| 4A | 10.9 |

TABLE 2

SURFACE INFRARED SPECTRA IN THE HYDROXYL
REGION OF VARIOUS ZEOLITES
Fourier Transform Infrared Spectra were obtained on
samples of zeolites in KBr pellets at 2% concentration.

| Zeolite: | Infrared Absorbance in the OH Region: | Combustion Resistance: |
| --- | --- | --- |
| Y-52 | sharp at 3440 cm.$^{-1}$ | active |
| 13X | sharp at 3440 cm.$^{-1}$ | active |
| ZLD 4040 | sharp at 3440 cm.$^{-1}$ | active |
| ZEOLEX 80 | broader, at 3440 cm.$^{-1}$ | active |
| ZEOLEX 35P | broad, like 23A and 80, at 3440 cm.$^{-1}$ | active |
| M-5 (mordenite) | strong, 3600 and 3440 cm.$^{-1}$ | active |
| Na$_2$CO$_3$ treated 4A | broad, 3440 cm.$^{-1}$ | some activity |
| ZEOLEX 23A | like ZEOLEX 80, at 3440 cm.$^{-1}$ | some activity |
| 4A hydrated | very broad, 3200-3600 cm$^{-1}$ maximum at 3400 cm.$^{-1}$ | some activity |
| Activated 4A, pH adjusted to 6.5 | maximum at 3420 | inactive |
| SAPO-5 | weak and diffuse | inactive |
| 10X | 3400 cm.$^{-1}$ | inactive |
| CO$_2$ loaded S-115 | weak and diffuse | inactive |
| 5A | 3200-3500 cm.$^{-1}$ maximum at 3350 | inactive |
| LZ-10 | weak and diffuse | inactive |
| ALPO-5 | weak and diffuse | inactive |

Examples 36-46

In these examples, foam formulations are disclosed which overcome the problems of foam shrinkage and of higher than desirable compression sets, while retaining the highly desired Advanced Combustion Resistance of foams modified with active zeolite.

Example 36 is a comparative example, not an operative part of the invention. Examples 41-43 are also comparative examples, not within the scope of the invention, of formulations prepared with non-chlorinated diol, Polyol PO.

These examples shown the beneficial effect on compression set of inclusion of a minor amount of chlorinated polyether, Polyol PN, or chlorinated "paraffin".

Examples 36-46

Foams Prepared to Explore Effects on Compression Set

| Base Formulation | |
| --- | --- |
| Polyol PD | 49 php. |
| Polyol PE | 35 |
| Polyol PH | 16 |
| Water | 3.75 |
| DEOA | 1.5 |
| Catalyst CA | 0.16 |
| Catalyst CB | 0.23 |
| Catalyst CD | 0.007 |
| Surfactant SA | 1.4 |

TDI (80/20) @ 105 Index

| Example: | Formulation Variable | 90% Compressions Set |
| --- | --- | --- |
| 36. | Control (no additive) | 13% |
| 37. | Control with ZEOLEX 80 @ 3 php. | 78.8 |
| 38. | 3.0 php. ZEOLEX 80, 5 php. Polyol PN | 10.8 |
| 39. | 3.0 php. ZEOLEX 80, 8 php. Polyol PN | 14.5 |
| 40. | 3.0 php. ZEOLEX 80, 10 php. Polyol PN | 20.0 |
| 41. | 3.0 php. ZEOLEX 80, 5 php. Polyol PO | 73.0 |
| 42. | 3.0 php. ZEOLEX 80, 10 php. Polyol PO | 81.0 |
| 43. | 3.0 php. ZEOLEX 80, 15 php. Polyol PO | 78.8 |
| 44. | 3.0 php. ZEOLEX 80, 5 php. chlorinated paraffin | 10.8 |
| 45. | 3.0 php. ZEOLEX 80, 8 php. chlorinated parrafin | 9.0 |
| 46. | 3.0 php. ZEOLEX 80, 10 php. chlorinated parrafin | 8.5 |

Examples 47-51

Example 47 is a comparative example, outside the scope of the invention. Examples 48-50 show the favorable effect of chlorinated aliphatic additive on compression set properties and foam shrinkage of active zeolite modified foams while retaining the desirable combustion resistance. Example 51 is a comparative example of use of an inorganic chloride, potassium chloride, outside the scope of this invention since the foam produced has a high compression set and requires crushing after pouring.

Foams Comparing Foam Shrinkage, Compression Set
and CAL 117A Test
Base Formulation: see Example 1.

| Example: | Formulation Variable: | Shrink: | Compression Set, 75% | CAL 117A after heat aging: no. passing out of 5 samples. |
|---|---|---|---|---|
| 47. | Control Foam | none | 11.6% | 0 out of 5 |
| 48. | 3 php. ZEOLEX 80 | foam required crushing | 59.7 | 5 out of 5 |
| 49. | 3 php. ZEOLEX 80 5 php. HYDRIN 10 | some shrinkage | 7.5 (average of 3 foams) | 5 out of 5 on each of 3 foams |
| 50. | 3 php. ZEOLEX 80 5 php. chloronated parrafin | no shrinkage, but no blow-off visible | 10.7 (average of 3 foams) | 5 out of 5 on each of 3 foams |
| 51. | 3 php.ZEOLEX 80 0.06 php. KCl | foam required crushing | 28.4 | 5 out of 5 |

Examples 52-55

Example 52 is a comparative example, outside the scope of the invention, which is an unmodified foam not showing the desired *Advanced Combustion Resistance*. Example 53 is also a comparative example of a similar foam modified only with the chlorinated additive and not the active zeolite. This foam in Example 53 has improved combustion resistance, but still not an adequate level of combustion resistance to pass CAL 117A.

Example 54 is within the scope of this invention in having the advanced combustion resistance imparted by the active zeolite; but, the foam has too high a compression set. Example 55 is within the scope of the invention and demonstrates the highly preferred practice of the invention.

| COMPARATIVE PROPERTIES OF FOAMS OF FOUR FORMULATIONS | | | | |
|---|---|---|---|---|
| Examples: | 52. | 53. | 54. | 55. |
| Formulations: | | | | |
| Polyol PD | 49 php. | 49 php. | 49 php. | 49 php. |
| Polyol PE | 35 | 35 | 35 | 35 |
| Polyol PH | 16 | 16 | 16 | 16 |
| Water: | 3.75 | 3.75 | 3.75 | 3.75 |
| DEOA: | 1.5 | 1.5 | 1.5 | 1.5 |
| Catalyst CA | 0.16 | 0.16 | 0.16 | 0.16 |
| Catalyst CB | 0.23 | 0.23 | 0.23 | 0.23 |
| Catalyst CD | 0.007 | 0.007 | 0.007 | 0.007 |
| Surfactant SA | 1.4 | 1.4 | 1.4 | 1.4 |
| Chlorinated Paraffin | — | 5.0 | — | 5.0 |
| ZEOLEX 80 | — | — | 3.0 | 3.0 |
| TDI @ 105 Index: | 47 | 47 | 47 | 47 |
| Foam Properties: | | | | |
| Density, lbs./ft3 | 1.58 | 1.69 | 1.61 | 1.70 |
| Resiliency, % | 60.0 | 62.0 | 44.0 | 40.0 |
| Porosity CFM/ft2 | 40.1 | 37.4 | 13.8 | 40.1 |
| IFD, 25% | 15.0 | 15.5 | 17.3 | 16.0 |
| 65% | 38.0 | 40.0 | 45.5 | 39.0 |
| 25% Return, lbs. | 12.0 | 12.5 | 11.8 | 12.8 |
| Rt. Value, lbs. | 80.0 | 80.7 | 68.1 | 79.7 |
| Load Ratio 65/25 | 2.53 | 2.58 | 2.64 | 2.44 |
| Tensile, psi. | 13.4 | 9.6 | 11.7 | 10.7 |
| Elong., % | 125.3 | 85.3 | 114.7 | 101.1 |
| Tear, lb./in. | 1.26 | 1.21 | 0.83 | 0.70 |
| Comp. set. 90% | 9.41 | 7.8 | 59.9 | 8.0 |
| Humid Age, 75% | 23.6 | 13.7 | 63.4 | 32.7 |
| Wet Set, 75% | 36.8 | 33.4 | 43.4 | 35.2 |
| Foams heat aged 24 hours at 104° C. before vertical burn (CAL 117A) testing: | | | | |

| -continued COMPARATIVE PROPERTIES OF FOAMS OF FOUR FORMULATIONS | | | | |
|---|---|---|---|---|
| Examples: | 52. | 53. | 54. | 55. |
| CAL 117A Test. Example:: | 52. | 53. | 54. | 55. |
| No. of Samples Passing out of Five: | 0/5 | 3/5 | 5/5 | 5/5 |

Examples 56-63

Example 56 is a comparative example, outside the scope of this invention, and is an example of an unmodified foam. The physical properties of the foam are very good; however, the foam does not show the desired *advanced combustion resistance.*

Example 57-63 demonstrate the use of a polymer polyol in which the dispersed polymer of the polymer polyol contains aliphatic chlorine in the form of copolymerized vinylidene chloride. Example 61 is outside the scope of the invention since only the aliphatic chlorine is present. Under this circumstance, improved combustion resistance is demonstrated; but, the improvement is not sufficient to meet the requirements of CAL 117A. Examples 58 and 59 are within the scope of the invention and are exemplary of the highly preferred practice of the invention.

Examples 60 and 61 are comparative, and outside the scope of the invention. Examples 62 and 63 are examples of the preferred practice of the invention having both active zeolite and aliphatic chlorine (provided through incorporation of the vinylidene chloride terpolymer polyol) in the foam formulations.

| Foams: | 56. | 57. | 58. | 59. |
|---|---|---|---|---|
| Formulations: | | | | |
| Polyol PD | 49 php | 49 | 41 | 20 |
| Polyol PE | 35 | 35 | — | — |
| Polyol PH | 16 | 16 | 16 | 16 |
| Polyol PF | — | — | 43 | — |
| Polyol PI | — | — | — | 64 |
| Water: | 3.75 | 3.75 | 3.75 | 3.75 |
| DEOA: | 1.5 | 1.5 | 1.5 | 1.5 |
| Catalyst CA | 0.16 | 0.16 | 0.16 | 0.16 |
| Catalyst CB | 0.23 | 0.23 | 0.23 | 0.23 |
| Catalyst CD | 0.007 | 0.007 | 0.007 | 0.007 |

-continued

| | | | | |
|---|---|---|---|---|
| Surfactant SA | 1.4 | 1.4 | 1.4 | 1.4 |
| Chlorinated Paraffin | — | 5.0 | — | — |
| ZEOLEX 80 | — | 3.0 | 3.0 | 3.0 |
| TDI @ 105 Index | 47.0 | 47.0 | 46.6 | 46.2 |
| Foam Properties: | 1. | 2. | 3. | 4. |
| Density, lb./cu.ft. | 1.69 | 1.70 | 1.65 | 1.64 |
| Resiliency, % | 61.0 | 58.0 | 59.0 | 50.0 |
| Porosity, CFM | 45.5 | 42.8 | 40.1 | 42.8 |
| IFD 25% | 17.8 | 18.8 | 20.8 | 28.3 |
| 65% | 44.3 | 44.0 | 49.8 | 68.0 |
| IFD 25% rt. | 14.8 | 14.8 | 16.5 | 19.8 |
| Return Value | 83.1 | 78.7 | 79.5 | 69.9 |
| IFD 65/25 | 2.49 | 2.35 | 2.40 | 2.41 |
| Tensile, psi | 12.0 | 11.6 | 10.4 | 13.6 |
| Elong. % | 103.1 | 103.1 | 94.2 | 90.3 |
| Tear, lbs./in. | 1.21 | 0.86 | 0.81 | 0.96 |
| Comp. 90%, % | 5.82 | 6.10 | 5.98 | 9.32 |
| HA Comp. Set 90, % | 53.4 | 56.8 | 30.1 | 77.3 |
| Wet Set 50, % | 29.6 | 27.3 | 21.9 | 34.2 |

Foams heat aged at 104° C. for 24 hours before CAL 117A testing.

| | | | | |
|---|---|---|---|---|
| Foams | 56 | 57 | 58 | 59 |
| Number of Samples passing CAL 117A out of Five: | 0/5 | 5/5 | 5/5 | 4/5 |

| Examples: | 60. | 61. | 62. | 63. |
|---|---|---|---|---|
| Formulations: | | | | |
| Polyol PD | 49 php. | 41 php. | 49 php. | 49 php. |
| Polyol PE | 35 | — | 20 | 5 |
| Polyol PH | 16 | 16 | 16 | 16 |
| Polyol PF | — | 43 | 15 | 30 |
| Water | 3.75 | 3.75 | 3.75 | 3.75 |
| DEOA | 1.5 | 1.5 | 1.5 | 1.5 |
| Catalyst CA | 0.16 | 0.16 | 0.16 | 0.16 |
| Catalyst CB | 0.23 | 0.23 | 0.23 | 0.23 |
| Catalyst CD | 0.007 | 0.007 | 0.007 | 0.007 |
| Surfactant SA | 1.4 | 1.4 | 1.4 | 1.4 |
| ZEOLEX 80 | — | — | 3.0 | 3.0 |
| TDI @ 105 Index: | 47.0 | 46.6 | 46.9 | 46.8 |
| | good foam, white | good foam, tan | corner shrink, some settle | slight shrink, slight settle |
| Foam Properties: | | | | |
| Density, lb./cu.ft. | 1.7 | 1.7 | 1.8 | 1.7 |
| Resiliency, % | 64.0 | 61.0 | 58.0 | 62.0 |
| Porosity, CFM | 78.3 | 67.6 | 40.1 | 75.1 |
| IFD 25% | 17.8 | 18.3 | 20.8 | 18.5 |
| 65% | 43.0 | 45.8 | 50.3 | 45.0 |
| IFD 25% rt. | 14.8 | 15.0 | 16.5 | 14.8 |
| Return Value | 83.1 | 82.2 | 79.5 | 79.7 |
| IFD 65/25 | 2.42 | 2.51 | 2.42 | 2.43 |
| Tensile, psi. | 12.7 | 16.0 | 16.1 | 12.0 |
| Elong., % | 123.7 | 142.6 | 96.1 | 100.1 |
| Tear, lbs./in. | 0.95 | 1.47 | 0.90 | 0.79 |
| Comp. 90%, % | 5.9 | 6.1 | 7.2 | 6.2 |
| HACS, 90%, % | 26.0 | 16.8 | 44.0 | 38.3 |
| Wet Set 50, % | 30.9 | 29.4 | 23.7 | 21.5 |

Foams heat aged at 104° C. for 24 hours before CAL 117A testing.

| Example: | 60. | 61. | 62. | 63. |
|---|---|---|---|---|
| Number of Samples Passing CAL 117A out of Five: | 0/5 | 3/5 | 5/5 | 5/5 |

Examples 64-68

In the CAL 117 combustibility test, a foam sample is heat aged in an air circulated oven at 104° C. for 24 hours before testing in a vertical burn test. Samples of the foam are tested both without heat aging and with the heat aging procedure. Both samples must pass the test. It was found that some active zeolites impart the advanced combustion resistance before heat aging but give variable results, sometimes requiring retesting, after heat aging. (Cal 117A provides for retesting if only 4 of 5 samples of one foam pass the vertical burn test.) The full effectiveness of other zeolites such as ZEOLEX 80 were not altered by the heat aging procedure.

It was then found that the inclusion of some melamine in the formulation with a zeolite such as LZY-52 was surprisingly beneficial in comparison with use of either melamine or LZY-52 alone. This discovery is demonstrated in Examples 64-68. Examples 64 and 65 are comparative and outside the scope of the invention.

| Examples | 64. | 65 | 66. | 67. | 68. |
|---|---|---|---|---|---|
| Formulation: | | | | | |
| Polyol PD | 49 php. | 49 php. | 49 php. | 49 php. | 49 php. |
| Polyol PE | 35 | 35 | 35 | 35 | 35 |
| Polyol PH | 16 | 16 | 16 | 16 | 16 |
| Polyol PF | 3.75 | 3.75 | 3.75 | 3.75 | 3.75 |
| DEOA | 1.5 | 1.5 | 1.5 | 1.5 | 1.5 |
| Catalyst CA | 0.16 | 0.16 | 0.16 | 0.16 | 0.16 |
| Catalyst CB | 0.23 | 0.23 | 0.23 | 0.23 | 0.23 |
| Catalyst CDD | 0.007 | 0.007 | 0.007 | 0.007 | 0.007 |
| LZY-52 | — | 3.0 | — | — | 3.0 |
| Melamine | — | — | 5.0 | 10.0 | 5.0 |
| TDI, 105 Index | 49.2 | 49.2 | 49.2 | 49.2 | 49.2 |

Results of CAL 117A test:
Number of Samples Passing out of 5 Tested:

| Example: | 64. | 65 | 66 | 67 | 68. |
|---|---|---|---|---|---|
| not heat aged: | 0/5 | 5/5 | 2/5 | 4/5 | 5/5 |
| heat aged, 104° C. for 24 hours: | 0/5 | 4/5 | 0/5 | 5/5 | 5/5 |

I claim:

1. A mixture comprising:
   (a) a polyol, at least 50 percent of whose hydroxyl groups are primary hydroxyl groups, and
   (b) a zeolite, said zeolite characterized by a water-slurry pH of at least 7.0 and a surface infrared hydroxyl absorbance in the range of 3400 to 3600 cm$^{-1}$, wherein said zeolite is present in said mixture in an amount ranging from 0.5 to 5 parts per hundred parts of polyol.

2. The mixture of claim 1 wherein at least 70 percent of polyol's hydroxyl groups are primary hydroxyl groups.

3. The mixture of claim 1 wherein the zeolite has a water-slurry pH of from 7.0 to 11.0.

4. The mixture of claim 1 wherein the zeolite is present in an amount ranging from 1 to 3 parts per hundred parts of polyol.

5. A mixture comprising:
   (a) a polymer/polyol, at least 50 percent of whose hydroxyl groups are primary hydroxyl groups, and
   (b) a zeolite, said zeolite characterized by a water-slurry pH of at least 7.0 and a surface infrared hydroxyl absorbance in the range of 3400 to 3600 cm$^{-1}$,
   wherein said zeolite is present in said mixture in an amount ranging from 0.5 to 5 parts per hundred parts of polyol.

6. A mixture comprising:
   (a) a polyol, at least 50 percent of whose hydroxyl groups are primary hydroxyl groups,
   (b) a zeolite, said zeolite characterized by a water-slurry pH of at least 7.0 and a surface infrared hydroxyl absorbance in the range of 3400 to 3600 cm$^{-1}$, and
   (c) 0.5 to 5 parts of an aliphatic chlorine per 100 parts of polyol, wherein said zeolite is present in said mixture in an amount ranging from 0.5 to 5 parts per hundred parts of polyol.

7. A mixture comprising:

(a) a polyol, at least 50 percent of whose hydroxyl groups are primary hydroxyl groups,
(b) a zeolite, said zeolite characterized by a water-slurry pH of at least 7.0 and a surface infrared hydroxyl absorbance in the range of 3400 to 3600 cm$^{-1}$, and
(c) 2 to 10 parts of melamine per 100 parts of polyol,
wherein said zeolite is present in said mixture in an amount ranging from 0.5 to 5 parts per hundred parts of polyol.

8. A mixture comprising:
(a) a polyol, at least 70 percent of whose hydroxyl groups are primary hydroxyl groups, and
(b) a zeolite, said zeolite characterized by a water-slurry pH ranging from 7.0 to 11.0 and a surface infrared hydroxyl absorbance in the range of 3400 to 3600 cm$^{-1}$,
wherein said zeolite is present in said mixture in an amount ranging from 1 to 3 parts per hundred parts of polyol.

9. A mixture comprising:
(a) a polyol, at least 70 percent of whose hydroxyl groups are primary hydroxyl groups, and
(b) a zeolite selected from the group consisting of Y-52, 13X, ZLD4040, ZEOLEX 80, ZEOLEX 35-P, M-5, and mixtures thereof,
wherein said zeolite is present in said mixture in an amount ranging from 1 to 3 parts per hundred parts of polyol.

10. A stable dispersion comprising:
(a) a polyol, at least 50 percent of whose hydroxyl groups are primary hydroxyl groups, and
(b) a zeolite selected from the group consisting of Y-52, ZLD4040 and mixtures thereof,
wherein said zeolite is present in said stable dispersion in an amount ranging from 0.5 to 5 parts per hundred parts of polyol.

* * * * *